United States Patent [19]

Inaba et al.

[11] Patent Number: 5,336,581
[45] Date of Patent: Aug. 9, 1994

[54] MICROCAPSULE, MICROCAPSULE TONER AND PROCESS FOR PREPARATION THEREOF

[75] Inventors: Yoshihiro Inaba; Takeshi Mikami, both of Minami-ashigara, Japan

[73] Assignee: Fuji Xerox Co., Ltd., Tokyo, Japan

[21] Appl. No.: 887,049

[22] Filed: May 26, 1992

[30] Foreign Application Priority Data

May 30, 1991 [JP] Japan ................... 3-153829
Jan. 10, 1992 [JP] Japan ................... 4-020718

[51] Int. Cl.$^5$ ............... B01J 13/16; B01J 13/22; G03C 1/72; G03G 9/093
[52] U.S. Cl. ................... 430/110; 264/4.32; 264/4.33; 428/402.21; 428/402.22; 428/402.24; 430/109; 430/137; 430/138; 523/201
[58] Field of Search ............ 428/402.21, 402.22, 428/402.24; 523/201; 430/109, 138, 110; 264/4.32, 4.33

[56] References Cited

U.S. PATENT DOCUMENTS

| | | | |
|---|---|---|---|
| 3,429,827 | 2/1969 | Ruus ........................ | 264/4.7 |
| 3,630,955 | 12/1971 | Emrick ....................... | 264/4.3 |
| 3,978,261 | 8/1976 | Ford et al. .................. | 523/201 X |
| 4,758,495 | 7/1988 | Yamaguchi et al. ............. | 430/138 |
| 4,806,635 | 2/1989 | Chupka ....................... | 430/109 |
| 4,851,318 | 7/1989 | Hsieh et al. ................. | 430/138 X |
| 4,877,714 | 10/1989 | Tsunoda et al. ............... | 430/138 X |
| 4,937,167 | 6/1990 | Moffat et al. ................ | 430/138 X |
| 4,965,159 | 10/1990 | Kohno et al. ................. | 430/138 X |
| 5,114,824 | 5/1992 | Tan et al. ................... | 430/138 X |

FOREIGN PATENT DOCUMENTS

| | | |
|---|---|---|
| 13-19574 | 9/1938 | Japan . |
| 17-446 | 1/1942 | Japan . |
| 49-45133 | 4/1974 | Japan . |
| 50-22507 | 3/1975 | Japan . |
| 58-66948 | 4/1983 | Japan . |
| 58-145964 | 8/1983 | Japan . |
| 59-148066 | 8/1984 | Japan . |
| 59-162562 | 9/1984 | Japan . |
| 62-227161 | 10/1987 | Japan . |
| 62-227162 | 10/1987 | Japan . |
| 63-163373 | 7/1988 | Japan . |
| 2-31381 | 2/1990 | Japan . |

*Primary Examiner*—Richard D. Lovering
*Attorney, Agent, or Firm*—Oliff & Berridge

[57] ABSTRACT

A microcapsule comprising a capsule shell having at least one polymer structure selected from the group consisting of a polyurea resin, a polyurethane resin, a polyamide resin, a polyester resin and an epoxy resin and containing a block and/or graft copolymer formed by the vinyl polymerization of vinyl monomers initiated by the decomposition of a polymerization-initiating azo group which has been previously incorporated in the polymer structure. A process for the preparation of a microcapsule, which comprises the steps of: (a) allowing a first capsule shell-forming monomer and a second capsule shell-forming monomer, at least one of which contains a polymerization-initiating azo group, to undergo reaction in the inside and/or at the border of an oily drop to form a capsule shell containing a polymerization-initiating azo group and having at least one polymer structure selected from the group consisting of a polyurea resin, a polyurethane resin, a polyamide resin, a polyester resin and an epoxy resin, and then (b) allowing vinyl monomers to be vinyl-polymerized to said capsule shell. A microcapsule toner which comprises the above microcapsule in which the vinyl monomers contain a charge controlling group. A process for the preparation of a microcapsule toner which comprises the above process for the preparation of a microcapsule in which the vinyl monomers contain a charge controlling group.

6 Claims, No Drawings

5,336,581

MICROCAPSULE, MICROCAPSULE TONER AND PROCESS FOR PREPARATION THEREOF

FIELD OF THE INVENTION

The present invention relates to a microcapsule and a process for the preparation thereof. The present invention also relates to a microcapsule toner and a process for the preparation thereof.

BACKGROUND OF THE INVENTION

Various proposals have heretofore been made on capsules composed of a core material and a capsule shell covering the core material. Among these proposals, microcapsules whose capsule shell have been partially or entirely formed by interfacial polymerization or in-situ polymerization are excellent in the completeness of covering of the core material and the retention of inner materials. Such microcapsules have been put into practical use, e.g., non-carbon paper and pressure measuring paper.

Since the capsule shell obtained by interfacial polymerization or in-situ polymerization nominally has a thickness of 0.5 $\mu$m or less, it is necessary that multifunctional capsule shell-forming monomers be used to form a polymer having a crosslinked structure so as to retain a core material, especially a core material containing a volatile liquid for a long period of time. However, the capsule shell made of a polymer having a crosslinked structure is disadvantageous in that it is brittle and thus has a poor mechanical strength. In particular, in the case where microcapsule grains are used in the form of powder, this disadvantage causes a great problem. Furthermore, since the capsule shell obtained by interfacial polymerization or in-situ polymerization is limited to polycondensation polymers or polyaddition polymers such as polyurea, polyurethane, polyamide, polyester and epoxy resins, it is difficult to obtain microcapsules provided with a special function or to modify the surface of microcapsules so as to provide the microcapsules with such a special function.

JP-A-62-227161 and JP-A-62-227162 (the term "JP-A" as used herein means an "unexamined published Japanese patent application") propose an approach which comprises the use of graft polymerization to provide capsule shell with a special function. However, polycondensation polymers or polyaddition polymers such as polyurea, polyurethane, polyamide, polyester and epoxy resins are disadvantageous in that they have a small capability of initiating graft polymerization. Therefore, a two-stage processing must be carried out in which monomers having a plurality of vinyl groups per molecule are bonded to a capsule shell with a catalyst such as a cerium salt, and monomers having a special function are then polymerized to the above vinyl group as an initiation point. Further, since this process essentially produces free polymers which are not grafted, reducing the efficiency of graft polymerization to the capsule shell, the improvement in the retention of the inner materials cannot be improved.

SUMMARY OF THE INVENTION

It is therefore an object of the present invention to provide a microcapsule and a microcapsule toner, which are excellent in the retention of the inner materials and mechanical strength and suitable for use particularly in the form of powder.

It is another object of the present invention to provide a microcapsule and a microcapsule toner having a capsule shell obtained with a wide degree of selection of materials.

It is further object of the present invention to provide a process for the preparation of the above microcapsules and microcapsule toners.

These and other objects of the present invention will become more apparent from the following detailed description and examples.

As a result of an extensive study, the present inventors have found that these objects of the present invention can be accomplished by allowing polymerization-initiating azo groups incorporated in a polymer constituting the capsule shell to undergo vinyl polymerization with vinyl monomers. Thus, the present invention has been worked out.

The present invention relates to a microcapsule comprising a capsule shell having at least one polymer structure selected from the group consisting of a polyurea resin, a polyurethane resin, a polyamide resin, a polyester resin and an epoxy resin and a block and/or graft copolymer formed by vinyl polymerization of vinyl monomers initiated by the decomposition of polymerization-initiating azo group which has been previously incorporated in the polymer structure.

The present invention also relates to a process for the preparation of a microcapsule, which comprises the steps of: (a) allowing a first capsule shell-forming monomer and a second capsule shell-forming monomer, at least one of which contains a polymerization-initiating azo group, to undergo reaction in the inside and/or at the border of an oily drop to form a capsule shell containing a polymerization-initiating azo group and having at least one polymer structure selected from the group consisting of a polyurea resin, a polyurethane resin, a polyamide resin, a polyester resin and an epoxy resin, and then (b) allowing vinyl monomers to be vinyl-polymerized to the capsule shell.

The present invention also relates to a microcapsule toner which comprises the above microcapsule in which the vinyl monomers contain a charge controlling group.

The present invention also relates to a process for the preparation of a microcapsule toner which comprises the above process for the preparation of a microcapsule in which the vinyl monomers contain a charge controlling group.

DETAILED DESCRIPTION OF THE INVENTION

In the present invention, the first capsule shell-forming monomer includes a polyamine, a polyol and a polybasic acid which can undergo reaction with the second capsule shell-forming monomer to form a polymer. The polymerization-initiating azo group includes an azo group which produces a radical via the denitrification by heat, ultraviolet light or radiation to initiate the polymerization of the vinyl monomers. The second capsule shell-forming monomer includes a compound containing two or more of at least one functional group selected from the group consisting of an isocyanate group, an epoxy group and an acid halide group per molecule.

Examples of the monomer containing the polymerization-initiating azo group used in the present invention include a polyamine, a polyol and a polybasic acid containing a polymerization-initiating azo group in the molecule, and a compound containing a polymerization-initiating azo group in the molecule and containing two or more of at least one functional group selected from the group consisting of an epoxy group, an acid halide group and an isocyanate group. In particular, a compound containing an isocyanate group and a polymerization-initiating azo group, a compound containing an acid halide group and a polymerization-initiating azo group, a polyamine containing a polymerization-initiating azo group, and a polyol containing a polymerization-initiating azo group preferably used.

Specific examples of the polyamine containing a polymerization-initiating azo group include 2,2'-azobis(2-amidinopropane), and 2,2'-azobis(2-methyl-4-aminobutylonitrile).

Specific examples of the polyol containing a polymerization-initiating azo group include azodiols such as 2,2'-azobis(2-cyanopropanol), 4,4'-azobis(4-cyanopentanol), 2,2'-azobis[2-methyl-N-(2-hydroxyethyl)propionic amide], 2,2'-azobis{2-methyl-N-[1,1-bis(hydroxymethyl)-2-hydroxyethyl]propionic amide}, and 2,2'-azobis[N-(4-hydroxyphenyl)-2-methylpropionic amidine], and azopolyols such as 2,2'-azobis{2-methyl-N-[1,1-bis(hydroxymethyl)ethyl]propionic amide} and 2,2'-azobis{2-methyl-N-[1,1-bis(hydroxymethyl)-2-hydroxyethyl]propionic amide]. Among these, 2,2'-azobis(2-cyanopropanol), 2,2'-azobis[2-methyl-N-(2-hydroxyethyl)propionic amide] and 2,2'-azobis{2-methyl-N-[1,1-bis(hydroxymethyl)-2-hydroxyethyl]propionic amide} are preferred.

Specific examples of the isocyanate containing a polymerization-initiating azo group include products of the reaction of an azodiol and a diisocyanate. Examples of the azodiol include 2,2'-azobis(2-cyanopropanol), 4,4'-azobis(4-cyanopentanol), 2,2'-azobis[2-methyl-N-(2-hydroxyethyl)propionic amide], 2,2'-azobis{2-methyl-N-[1,1-bis(hydroxymethyl)-2-hydroxyethyl]propionic amide} and 2,2'-azobis-[N-(4-hydroxyphenyl)-2-methylpropionic amidine] or azopolyol such as 2,2'-azobis{2-methyl-N-[1,1-bis(hydroxymethyl)ethyl]propionic amide} and 2,2'-azobis{2-methyl-N-[1,1-bis(hydroxymethyl)-2-hydroxyethyl]propionic amide}. Examples of the diisocyanate include metaphenylene diisocyanate, tolylene diisocyanate, diphenylmethane diisocyanate, 3,3'-dimethyldiphenyl-4,4'-diisocyanate, 3,3'-dimethyl-diphenylmethane-4,4'-diisocyanate, xylylene diisocyanate, naphthalene diisocyanate and hexamethylene diisocyanate.

The reaction product of an azo compound selected from 2,2'-azobis(2-cyanopropanol), 2,2'-azobis[2-methyl-N-(2-hydroxyethyl)propionic amide] and 2,2'-azobis{2-methyl-N-[1,1-bis(hydroxymethyl)-2-hydroxyethyl]propionic amide}, and an isocyanate compound selected from tolylene diisocyanate, diphenylmethane diisocyanate, xylylene diisocyanate, hexamethylene diisocyanate and polyisocyanate is preferably used.

Specific examples of acid halides containing polymerization-initiating azo group include 4,4'-azobis4-cyanopentanoic acid chloride, and 2,2'-azobis(2-methylpropionic acid chloride).

If necessary, a capsule shell-forming monomer free of azo group may be mixed with the above mentioned azo group-introduced capsule shell-forming monomers.

The amount of the monomer containing the polymerization-initiating azo group is generally from 1 to 90% by weight, preferably from 10 to 60% by weight, based on the total amount of the monomers.

Examples of the azo group-free capsule shell-forming monomer as the first capsule shell-forming monomer include polyol such as naphthalenediol, ethylene glycol, 1,4-butanediol, catechol, resorcinol, hydroquinone, o-dihydroxymethylbenzene, 4,4'-dihydroxydiphenylmethane, bisphenol A and 2,2'-bis(4-hydroxyphenyl)-propanol, polyamine such as ethylenediamine, tetramethylenediamine, hexamethylenediamine, phenylenediamine, diethylenetriamine, triethylenetetramine, diethylaminopropylamine and tetraethylenepentamine, and piperazine compound such as piperazine, 2-methylpiperazine and 2,5-dimethylpiperazine. Among these, naphthalenediol, 4,4'-dihydroxydiphenylmethane, bisphenol A, ethylenediamine, diethylenetriamine and tetraethylenetetramine are preferred, and naphthalenediol, bisphenol A and diethylenetriamine are more preferred.

Examples of the azo group-free capsule shell-forming monomer as the second capsule shell-forming monomer include a polyisocyanate, an epoxy resin, and a dibasic acid halide. Preferred among these compounds is a polyisocyanate. Specific examples of such a polyisocyanate include diisocyanates such as metaphenylene diisocyanate, tolylene diisocyanate, diphenylmethane diisocyanate, 3,3'-dimethyldiphenyl-4,4'-diisocyanate, 3,3'-dimethyl-diphenylmethane-4,4'-diisocyanate, xylylene diisocyanate, naphthalene diisocyanate and hexamethylene diisocyanate, and polyisocyanates known as biuret type, adduct type and isocyanurate type polyisocyanates. Examples of the epoxy resin include those known as bisphenol A type, resorcin type, bisphenol F type, tetrahydroxyphenylmethane type, novolak type, polyalcohol type, polyglycol type and glycerin triether type epoxy resins. Among these, tolylene diisocyanate, diphenylmethane diisocyanate, xylylene diisocyanate, hexamethylene diisocyanate and polyisocyanate are preferred.

Examples of the dibasic acid halide include adipoyl dichloride, phthaloyl dichloride, terepthaloyl dichloride, and 1,4-cyclohexanedicarbonyl chloride. These dibasic acid halides may be used in admixture.

As the process for the preparation of a microcapsule which comprises the reaction of a first capsule shell-forming monomer and a second capsule shell-forming monomer both present in an oily drop in the interior and/or interface of the oily drop to form a capsule shell, a conventional method known as the inner in-situ polymerization process (as disclosed in JP-B-49-45133 and JP-B-50-22507 (the term "JP-B" as used herein means an "examined Japanese patent publication")) can be employed. As the process for the preparation of a microcapsule which comprises the reaction of a second capsule shell-forming monomer present in an oily drop and a first capsule shell-forming monomer present outside the oily drop in the interface of the oily drop to form a capsule shell, a conventional method known as the interfacial polymerization process (as disclosed in JP-B-38-19574, JP-B-42-446, JP-B-2-31381, JP-A-58-66948, JP-A-59-148066 and JP-A-59-162562) can be employed. The polymerization reaction to form microcapsule is preferably effected at a temperature of 60° C. or lower, more preferably 40° C. or lower, to protect the polymerization-initiating azo group. If necessary, a catalyst for accelerating polymerization such as a tertiary amine and an organic tin compound may be incorporated in the oily drop.

Furthermore, the capsule shell to be formed may be a composite capsule shell made of a polymer membrane formed by interfacial polymerization and a polymer membrane formed by spray drying or a composite capsule shell made of a polymer membrane formed by radical polymerization reaction and a polymer membrane formed by interfacial polymerization.

As the vinyl monomer to be vinyl-polymerized to the capsule shell containing polymerization-initiating azo group thus formed, any compound which can undergo vinyl polymerization can be used. Examples of such a compound include vinyl monomers as described in *Kobunshi Data Handbook* (High Molecular Weight Compound Data Handbook), pages 1–364, edited by the Society of Polymer Science, Japan, published by Baifukan, Japan (1986). Specific examples of such vinyl monomers include (meth)acrylic acid monomers such as (meth)acrylic acid, methyl (meth)acrylate, ethyl (meth)acrylate, butyl (meth)acrylate, 2-ethylhexyl (meth)acrylate, lauryl (meth)acrylate, stearyl (meth)acrylate, cyclohexyl (meth)acrylate, benzyl (meth)acrylate, 2-hydroxyethyl (meth)acrylate, 2-hydroxypropyl (meth)acrylate, allyl (meth)acrylate, dimethylaminoethyl (meth)acrylate, diethylaminoethyl (meth)acrylate, (meth)acrylic acid dimethylaminoethylmethyl chloride, trifluoroethyl (meth)acrylate, glycidyl (meth)acrylate, tetrahydrofufuryl (meth)acrylate, ethylene glycol (meth)acrylate, 1,3-butylene glycol (meth)acrylate, trimethylolpropane tri(meth)acrylate, (meth)acrylic acid chloride and (meth)acrylonitrile, (meth)acrylamide monomers such as (meth)acrylamide, N-methyl(meth)acrylamide, N-ethyl(meth)acrylamide, N-butyl(meth)acrylamide, N-benzyl(meth)acrylamide, N-phenyl(meth)acrylamide, N,N-dimethyl(meth)acrylamide, N-hydroxymethyl(meth)acrylamide, N,N'-methylenebisacrylamide, diethylaminoethyl(meth)acrylamide, dimethylaminoethyl(meth)acrylamide and N-acroylglycinamide, styrene monomers such as styrene, methylstyrene, aminostyrene, formylstyrene, hydroxystyrene, vinylbenzoic acid, vinylbenzoic ester, styrenesulfonic acid, sodium styrenesulfonate, ester styrenesulfonate, alkoxystyrene and divinylbenzene, vinyl esters such as vinyl acetate, vinyl chloroacetate, vinyl trifluoroacetate, vinyl propionate, vinyl pivalate, vinyl laurate, vinyl stearate and vinyl formate, vinyl ether monomers such as methyl vinyl ether, ethyl vinyl ether, butyl vinyl ether, 2-ethylhexyl vinyl ether, methoxyethyl vinyl ether and diethylene glycol divinyl ether, vinyl ketone monomers such as methyl vinyl ketone, methyl isopropenyl ketone, benzylidene acetone, benzylidene acetophenone, diisopropylidene acetone, 2-cyclopentene-1-one, acrolein, methacrolein, crotonaldehyde and cinnamaldehyde, maleic anhydride and substituted compounds thereof, ester maleate, maleamide and substituted compounds thereof, maleimide and substituted compounds thereof, and nitrogen-containing vinyl monomers such as vinylpyrrolidone, vinylpyridine, vinylimidazole, 1-vinyl-2-methylimidazole, vinylcarbazole, N-vinyl-2-caprolactam and N-vinylphthalimide. Among these, (meth)acrylic acid monomers, (meth)acrylamide monomers, styrene monomers, vinyl ester monomers and vinyl ether monomers are preferred, and (meth)acrylic acid monomers, styrene monomers and vinyl ester monomers are more preferred. These monomers may be used singly, or two or more kinds of these monomers may be used in admixture. If two or more kinds of these monomers are used in admixture, they may be reacted collectively or separately in succession.

The term "(meth)acrylate" and the like used herein mean "acrylate and methacrylate" and the like.

Another feature of the present invention is that it is easy to provide the capsule shell with a special function. That is, when a monomer having a special function is vinyl-polymerized as the above mentioned vinyl monomer to the capsule shell singly or in combination with other vinyl monomers, a microcapsule having a special function can be obtained. Examples of such a monomer having a special function include monomers as described in *Kinosei Kobunshi* (Functional High Molecular Weight Compounds), edited by the Society of Polymer Science, Japan, published by Kyoritsu Shuppan, Japan (1980); and Hiromi Kamogawa, *Tokushukino wo Yuusuru Yukibusshitsu no Gosei to Kino* (Synthesis and Functions of Organic Matters with Special Functions), published by I.P.C., Japan (1989). The amount of the monomer having a special function is generally from 1% by weight or more, preferably 5% by weight or more, based on the total amount of the vinyl monomer.

For example, in order to obtain a capsule capable of inhibiting the transmission of ultraviolet light to the core material, a vinyl monomer containing an ultraviolet-absorbing component such as orthohydroxybenzophenone, ester salicylate and benzotriazole compound may be graft-polymerized to the capsule shell.

In another example, in order to obtain a pressure-sensitive coloring microcapsule, a vinyl monomer containing a pressure-sensitive dye component such as triphenylmethanephthalide compound and fluoran may be block- and/or graft-polymerized to the capsule shell with the capsule core material containing a color developer such as phenol compound and aromatic carboxylic acid derivative. Thus, a pressure-sensitive coloring microcapsule can be obtained which is destroyed under pressure to cause the reaction of the color developer in the core material and the pressure-sensitive dye component in the capsule shell to develop colors.

The vinyl polymerization of the vinyl monomer to the capsule shell containing a polymerization-initiating azo group can be accomplished by dispersing capsules containing a polymerization-initiating azo group in an aqueous medium or an oily medium, adding the vinyl monomer to the dispersion, and then heating the material or applying ultraviolet light to cause polymerization. An additive such as a surface active agent and a dispersion stabilizer may be added to the dispersion.

The core material is not specifically limited. The core material may be a high molecular weight compound, a low molecular weight compound or a liquid material such as an oil. If the microcapsule is used as powdered ink, as the core material, a binder, a coloring material and optionally an oil can be used. If the microcapsule is used as a finely divided heat-sensitive coloring particles or finely divided pressure-sensitive coloring particles, an oil, a heat-sensitive coloring material, a pressure-sensitive coloring material, and optionally a high molecular weight compound can be used as the core material.

As the binder resin, any known fixing resin can be used. Specifically, acrylic ester polymers such as polymethyl acrylate, polyethyl acrylate, polybutyl acrylate, poly-2-ethylhexyl acrylate and polylauryl acrylate; methacrylic ester polymers such as polymethyl methacrylate, polybutyl methacrylate, polyhexyl methacrylate, poly-2-ethylhexyl methacrylate and polylauryl methacrylate; copolymers of a styrene monomer and an acrylic or methacrylic ester; ethylenic polymers such as polyvinyl acetate, polyvinyl propionate, polyvinyl butyrate, polyethylene, polypropyrene and copolymers thereof; styrene copolymers such as a styrene-butadiene copolymer, a styrene-isopropyrene copolymer and a styrene-maleic acid copolymer; polyvinyl ethers; polyvinyl ketones; polyesters; polyamides; polyurethanes; rubbers; epoxy resins; polyvinyl butyral; rosin; modified rosin; terpene resin; phenol resin; etc. may be used singly or in admixture. Alternatively, these binder resins may be charged in the system in the form of monomers which are then polymerized after the formation of capsules to become a binder resin.

As the oil, an oil having a boiling point of 140° C. or higher, preferably 160° C. or higher, and capable of dissolving the binder resin therein can be used. Such an oil can be selected from those described in the item of "Plasticizers", *Modern Plastics Encyclopedia*, pp. 692–704 (1975–1976). Furthermore, such an oil can be selected from the high boiling solvents disclosed as core materials for pressure-fixing capsule toner in JP-A-58-145964 and JP-A-63-163373.

Specific examples of such an oil include phthalic esters (e.g., diethyl phthalate, dibutyl phthalate), aliphatic dicarboxylic esters (e.g., diethyl malonate, dimethyl oxalate), phosphoric esters (e.g., tricresyl phosphate, trixylyl phosphate), citric esters (e.g., o-acetyltriethyl citrate), benzoic esters (e.g., butyl benzoate, hexyl benzoate), aliphatic esters (e.g., hexadecyl myristate, dioctyl adipate), alkylnaphthalenes (e.g., methyl naphthalene, dimethyl naphthalene, monoisopropyl naphthalene, diisopropyl naphthalene), alkyl diphenyl ethers (e.g., o-, m-, or p-methyl diphenyl ether), higher aliphatic or aromatic sulfonic acid amide compounds (e.g., N,N-dimethyllauroamide, N-butylbenzenesulfonamide), trimellitic esters (e.g., trioctyl trimellitate), diarylalkanes (e.g., diarylmethane such as dimethyl phenyl phenyl methane, diaryl ethane such as 1-phenyl-1-methyl phenyl ethane, 1-dimethylphenyl-1-phenyl ethane and 1-ethylphenyl-1-phenyl ethane), and chlorinated paraffins.

Furthermore, if a polymer containing a long-chain alkyl group such as a lauryl methacrylate homopolymer or copolymer is used as the binder, an organic solvent containing an aliphatic saturated hydrocarbon or an aliphatic saturated hydrocarbon as main component (e.g., Isopar-G, Isopar-H, Isopar-L, produced by Exon Chemical) may be used as the oil.

Examples of the coloring materials, which can be used in the present invention, include inorganic pigments such as carbon black, red oxide, Prussian blue and titanium oxide; azo pigments such as fast yellow, disazo yellow, pyrazolone red, chelate red, brilliant carmine and para brown, phthalocyanine pigments such as copper phthalocyanine and metal-free phthalocyanine; and condensed polycyclic pigments such as flavanthrone yellow, dibromoanthrone orange, perylene red, quinacridone red and dioxadine violet. Furthermore, dipsersed dyes, oil-soluble dyes, etc. may be used.

If the microcapsule is used as a magnetic one-component toner, the black coloring material may be entirely or partially replaced by magnetic powder. As the magnetic powder, a simple metal substance or its alloy such as magnetite, ferrite, cobalt, iron and nickel can be used. Magnetic powder surface-treated with a coupling agent such as a silane coupling agent and a titanate coupling agent or covered with an acrylic resin, styrene resin or an epoxy resin may also be used.

Moreover, the coloring material or the magnetic powder charged as core material may be present in the interface of the core and the shell or in the shell after the formation of the capsule.

Examples of the heat-sensitive coloring material or pressure-sensitive coloring material include an organic compound which develops color when coming in contact with a solid acid such as acid clay and a phenolic resin. Such an organic compound can be selected from those described in Kenjiro Yamamoto, "Article 8: Kanatsushikiso/Kannetsushikiso to soho Oyo (Pressure-sensitive dyes/heat-sensitive dyes and their application)", *Kinoseishikiso no Kagaku* (Chemistry of Functional Dyes), edited by Shin Ogawara, Nobuhiko Kuroki and Teijiro Kitao, published by C.M.C., Japan (1981). Specific examples of such an organic compound include crystal violet lactone, benzoyl leuco methylene blue, malachite green lactone, rhodamine B lactam, 2,4-dialkyl-7-dialkylaminofluoranes, 3-dialkylamino-7-dialkylaminofluoranes, and 3-alkyl-spiro-dinaphthopyranes.

Examples of the process for incorporating the above mentioned materials in the capsule as core materials include: a process which comprises charging the above mentioned materials in the system in the form of polymers together with other core-forming components, low boiling solvents and capsule shell-forming components, and then expelling the low boiling solvent from the system at the same time with or after the formation of a capsule shell by a polymerization process to form a core material; and a process which comprises charging the above mentioned materials in the system in the form of monomers, forming a capsule shell by a polymerization process, and then polymerizing the monomers to form a core material. These processes can be properly used.

If the microcapsule is used as a microcapsule toner, an additive such as silicon oxide, aluminum oxide, titanium oxide and carbon black may be added to the microcapsule to provide the microcapsule with fluidity or chargeability. In the process for providing the microcapsule of the present invention with chargeability, a monomer such as amino group-containing methacrylate and quaternary ammonium salt-containing methacrylate in the case where positive charge is provided, or a monomer such as methacrylic acid and trifluoroethyl methacrylate in the case where negative charge is provided, may be added to water, an organic solvent, or a mixture thereof, together with the microcapsule of the present invention, followed by being heated. In this process, the capsule can be easily provided with chargeability.

If two or more kinds of monomers are used, they may be collectively reacted, or successive addition may be effected in which the reaction of the first monomer is followed by the addition of the second monomer to be successively reacted.

The present invention will be further described in the following examples, but the present invention should not be construed as being limited thereto.

EXAMPLE 1

Synthesis of the Second Capsule Shell-forming Monomer Introduced With Polymerization-initiating Azo Group 200 ml of dried ethyl acetate and 40 g of tolylene diisocyanate (Coronate T, produced by Nippon Polyurethane Co., Ltd.) were charged into a 500-ml round flask equipped with a condenser with a calcium chloride pipe. Dissolution was effected with stirring by means of a magnetic stirrer. 20 g of 2,2'-azobis(2-cyanopropanol) (VF-077, produced by Wako Pure Chemical Industries, Ltd.) was added to the resulting solution. The reaction system was then reacted at a temperature of 30° C. for 12 hours. After the completion of reaction, ethyl acetate was then removed under reduced pressure to obtain the second capsule shell-forming monomer introduced polymerization-initiating azo group.

Preparation of Capsule Grains

To a mixture of 20 g of dibutyl phthalate and 30 g of ethyl acetate was added 30 g of polyisobutyl methacrylate (weight average molecular weight: $16 \times 10^4$). Dissolution was then effected. To the solution thus obtained was added 40 g of a magnetic powder (EPT-1000, produced by Toda Kogyo K.K.), and then dispersed by means of a ball mill for 16 hours. To 100 g of the dispersion was added a mixture of 10 g of the above mentioned capsule shell-forming monomer, 5 g of a polyisocyanate (Sumidur L, produced by Sumitomo Bayer Urethane K.K.) and 10 g of ethyl acetate. The composition was thoroughly mixed to obtain Solution A.

10 g of hydroxypropyl methylcellulose (Metrose 65SH50, produced by The Shin-etsu Chemical Industry Co., Ltd.) was dissolved in 180 g of ion-exchanged water. The solution was then cooled to a temperature of 5° C. to obtain Solution B.

Solution A was gradually added to Solution B while the latter was stirred by means of an emulsifier (Autohomomixer produced by Tokushu Kako K.K.). Thus, an O/W (oil-in-water) type emulsion comprising oil drops having an average grain diameter of about 12 μm was obtained.

The emulsion was then stirred at 400 r.p.m. by means of an agitator equipped with propeller blades (Three-one motor, produced by Shinto Kagaku K.K.) instead of the emulsifier. After 10 minutes, to the emulsion was added dropwise 100 g of a 2.5% aqueous solution of diethylene triamine as the first capsule shell-forming monomer. After the completion of dropwise addition, capsulization reaction was effected for 3 hours while ethyl acetate was removed at a temperature of 40° C. under reduced pressure. After the completion of reaction, the reaction system was poured into 2 l of ion-exchanged water. The mixture was thoroughly stirred and then allowed to stand. After the sedimentation of capsule grains, the supernatant was removed. This procedure was repeated seven times to wash the capsule grains. Thus, capsule grains in which polymerization-initiating azo groups had been introduced into the polymer constituting the capsule shell were obtained.

To the above mentioned capsule grains was added ion-exchanged water to prepare a suspension having a solid content of 40%. 125 g of the suspension of capsule grains thus prepared (corresponding to 50 g of capsule grains) was charged into a 1-l separable flask equipped with a condenser and an nitrogen intake pipe. 125 g of ion-exchanged water was added to the system. The mixture was then stirred at 200 r.p.m. in a nitrogen atmosphere by means of an agitator equipped with propeller blades (Three-one motor produced by Shinto Kagaku K.K.). To the mixture were added 0.5 g of methacryloyloxyethyl trimethyl-ammonium chloride and 5.0 g of methyl methacrylate. The reaction system was then allowed to undergo reaction at a temperature of 70° C. for 6 hours. After the completion of reaction, the reaction system was poured into 2 l of ion-exchanged water, thoroughly stirred, and then allowed to stand. After the sedimentation of capsule grains, the supernatant was removed. This procedure was repeated four times to wash the capsule grains. The capsule dispersion thus obtained was poured into a stainless steel tray where it was then dried at a temperature of 60° C. for 10 hours in a drier (produced by Yamato Kagaku K.K.) to obtain capsule grains of the present invention.

3 g of the capsule grains thus obtained and 100 g of an iron powder carrier were mixed in an atmosphere of a temperature of 20° C. and a humidity of 50%. The mixture was then measured for amount of electric charge as a capsule toner by blow-off method. As a result, it was determined to be $+20$ μC/g, showing an excellent positive chargeability. Furthermore, the dibutyl phthalate content of the capsule grains thus obtained was measured by thermogravimetric analysis. As a result, it was determined to be 15% based on the weight of the capsule. The capsule grains were heat-treated at a temperature of 80° C. for 24 hours in an oven, and then similarly measured for the dibutyl phthalate content by thermogravimetric analysis. As a result, it was determined to be 14% based on the total weight of the capsule grains. The capsule grains thus exhibited an excellent retention of inner materials.

COMPARATIVE EXAMPLE 1

Capsule grains were obtained for comparison in the same manner as in Example 1 except that only 15 g of a polyisocyanate (Sumidur-L, produced by Sumitomo Bayer Urethane K.K.) was added to the magnetic powder dispersion instead of the second polymerization-initiating azo group-introduced capsule shell-forming monomer.

3 g of the capsule grains thus obtained and 100 g of an iron powder carrier were mixed in an atmosphere of a temperature of 20° C. and a humidity of 50%. The mixture was then measured for amount of electric charge as a capsule toner by blow-off method. As a result, it was determined to be $+1$ μC/g, showing little or no chargeability. Furthermore, the dibutyl phthalate content of the capsule grains thus obtained was measured by thermogravimetric analysis. As a result, it was determined to be 15% based on the weight of the capsule. The capsule grains were heat-treated at a temperature of 80° C. for 24 hours in an oven, and then similarly measured for the dibutyl phthalate content by thermogravimetric analysis. As a result, it was determined to be 9% based on the total weight of the capsule grains. The capsule grains exhibited a poor retention of inner materials.

EXAMPLE 2

Preparation of Capsule Grains

To a mixture of 20 g of dibutyl phthalate, 30 g of Isopar H (main component: isoparaffin oil, produced by Exxon Chemical) and 40 g of ethyl acetate was added 50 g of polylauryl methacrylate (weight average molecular weight: $5 \times 10^4$). Dissolution was then effected. To the solution thus obtained was added 100 g of a magnetic powder (EPT-1000, produced by Toda Kogyo K.K.), and then dispersed by means of a ball mill for 16 hours. To 100 g of the dispersion were added 15 g of 2,2'-azobis(2-cyanopropanol) (VF-077, produced by Wako Pure Chemical Industries, Ltd.) as the first capsule shell-forming monomer, 10 g of tolylene diisocyanate (Coronate-T, produced by Nippon Polyurethane K.K.), 10 g of a polyisocyanate (Sumidur L, produced by Sumitomo Bayer Urethane K.K.) and 24 g of ethyl acetate. The composition was thoroughly mixed to obtain Solution A.

10 g of hydroxypropyl methylcellulose (Metrose 65SH50, produced by The Shin-etsu Chemical Industry Co., Ltd.) was dissolved in 200 g of ion-exchanged water. The solution was then cooled to a temperature of 5° C. to obtain Solution B.

Solution A was gradually added to Solution B while the latter was stirred by means of an emulsifier (Autohomomixer produced by Tokushu Kako K.K.). Thus, an O/W type emulsion comprising oil drops having an average grain diameter of about 12 μm was obtained.

The emulsion was then stirred at 400 r.p.m. by means of an agitator equipped with propeller blades (Three-one motor, produced by Shinto Kagaku K.K.) instead of the emulsifier. Capsulization reaction was effected for 3 hours while ethyl acetate was removed at a temperature of 40° C. under reduced pressure. After the completion of reaction, the reaction system was poured into 2 l of ion-exchanged water. The mixture was thoroughly stirred and then allowed to stand. After the sedimentation of capsule grains, the supernatant was removed. This procedure was repeated seven times to wash the capsule grains. Thus, capsule grains in which polymerization-initiating azo groups had been introduced into the polymer constituting the capsule shell were obtained.

To the above mentioned capsule grains was added ion-exchanged water to prepare a suspension having a solid content of 40%. 125 g of the suspension of capsule grains thus prepared (corresponding to 50 g of capsule grains) was charged into a 1-l separable flask equipped with a condenser and an nitrogen intake pipe. 125 g of ion-exchanged water was added to the system. The mixture was then stirred at 200 r.p.m. in a nitrogen atmosphere by means of an agitator equipped with propeller blades (Three-one motor produced by Shinto Kagaku K.K.). To the mixture were added 2.0 g of diethylaminoethyl methacrylate and 4.0 g of methyl methacrylate. The reaction system was then allowed to undergo reaction at a temperature of 70° C. for 5 hours. After the completion of reaction, the reaction system was poured into 2 l of ion-exchanged water, thoroughly stirred, and then allowed to stand. After the sedimentation of capsule grains, the supernatant was removed. This procedure was repeated four times to wash the capsule grains. The capsule dispersion thus obtained was poured into a stainless steel tray where it was then dried at a temperature of 60° C. for 10 hours in a drier (produced by Yamato Kagaku K.K.) to obtain capsule grains of the present invention.

3 g of the capsule grains thus obtained and 100 g of an iron powder carrier were mixed in an atmosphere of a temperature of 20° C. and a humidity of 50%. The mixture was then measured for amount of electric charge as a capsule toner by blow-off method. As a result, it was determined to be +18 μC/g, showing an excellent positive chargeability. Furthermore, the content of Isopar H in the capsule grains thus obtained was measured by thermogravimetric analysis. As a result, it was determined to be 10% based on the weight of the capsule. The capsule grains were heat-treated at a temperature of 80° C. for 24 hours in an oven, and then similarly measured for Isopar H content by thermogravimetric analysis. As a result, it was determined to be 9% based on the total weight of the capsule grains. The capsule grains exhibited an excellent retention of inner materials.

COMPARATIVE EXAMPLE 2

Capsule grains were obtained in the same manner as in Example 2 except that 15g of bisphenol A was added to the magnetic powder dispersion instead of 2,2'-azobis(2-cyanopropanol) as the first polymerization-initiating azo group-introduced capsule shell-forming monomer.

3 g of the capsule grains thus obtained and 100 g of an iron powder carrier were mixed in an atmosphere of a temperature of 20° C. and a humidity of 50%. The mixture was then measured for amount of electric charge as a capsule toner by blow-off method. As a result, it was determined to be +1 μC/g, showing little or no chargeability. Furthermore, the content of Isopar H in the capsule grains thus obtained was measured by thermogravimetric analysis. As a result, it was determined to be 10% based on the weight of the capsule. The capsule grains were heat-treated at a temperature of 80° C. for 24 hours in an oven, and then similarly measured for Isopar H content by thermogravimetric analysis. As a result, it was determined to be 4% based on the total weight of the capsule grains. The capsule grains exhibited a poor inner retention of inner materials.

EXAMPLE 3

To a mixture of 10 g of dibutyl phthalate, 40 g of Isopar H (produced by Exxon Chemical) and 40 g of ethyl acetate were added 50 g of polylauryl methacrylate (weight average molecular weight: $5 \times 10^4$) and 30 g of polyisobutyl methacrylate (weight average molecular weight: $16 \times 10^4$). Dissolution was then effected. To the solution thus obtained was added 120 g of a magnetic powder (EPT-1000, produced by Toda Kogyo K.K.). The mixture was then dispersed by means of a ball mill for 16 hours. To 200 g of the dispersion were added 15 g of 2,2'-azobis(2-cyanopropanol)(VF-077, produced by Wako Pure Chemical Industries, Ltd.) as the first capsule shell-forming monomer, 10 g of tolylene diisocyanate (Coronate-T, produced by Nippon Polyurethane K.K.), 10 g of a polyisocyanate (Sumidur L, produced by Sumitomo Bayer Urethane K.K.) and 24 g of ethyl acetate. The composition was thoroughly mixed to obtain Solution A.

10 g of hydroxypropyl methylcellulose (Metrose 65SH50, produced by The Shin-etsu Chemical Industry Co., Ltd.) was dissolved in 200 g of ion-exchanged water. The solution was then cooled to a temperature of 5° C. to obtain Solution B.

Solution A was gradually added to Emulsion B while the latter was stirred by means of an emulsifier (Autohomomixer produced by Tokushu Kako K.K.). Thus, an O/W type emulsion comprising oil drops having an average grain diameter of about 12 μm was obtained.

The emulsion was then stirred at 400 r.p.m. by means of an agitator equipped with propeller blades (Three-one motor, produced by Shinto Kagaku K.K.) instead of the emulsifier. Capsulization reaction was effected for 3 hours while ethyl acetate was removed at a temperature of 40° C. under reduced pressure. After the completion of reaction, the reaction system was poured into 2 l of ion-exchanged water. The mixture was thoroughly stirred and then allowed to stand. After the sedimentation of capsule grains, the supernatant was removed. This procedure was repeated seven times to wash the capsule grains. Thus, capsule grains in which polymerization-initiating azo groups had been introducer into the polymer constituting the capsule shell were obtained.

To the above mentioned capsule grains was added ion-exchanged water to prepare a suspension having a solid content of 40%. 125 g of the suspension of capsule grains thus prepared (corresponding to 50 g of capsule grains) was charged into a 1-l separable flask equipped with a condenser and an nitrogen intake pipe. 125 g of ion-exchanged water was added to the system. The mixture was then stirred at 200 r.p.m. in a nitrogen atmosphere by means of an agitator equipped with propeller blades (Three-one motor produced by Shinto Kagaku K.K.). To the mixture was added 1.0 g of diethylaminoethyl methacrylate and 2.0 g of methyl methacrylate. The reaction system was then allowed to undergo reaction at a temperature of 70° C. for 5 hours. After the completion of reaction, the reaction system was poured into 2 l of ion-exchanged water, thoroughly stirred, and then allowed to stand. After the sedimentation of capsule grains, the supernatant was removed. This procedure was repeated four times to wash the capsule grains. The capsule dispersion thus obtained was poured into a stainless steel tray where it was then dried at a temperature of 60° C. for 10 hours in a drier (produced by Yamato Kagaku K.K.) to obtain capsule grains of the present invention.

3 g of the capsule grains thus obtained and 100 g of an iron powder carrier were mixed in an atmosphere of a temperature of 20° C. and a humidity of 50%. The material was then measured for amount of electric charge on capsule toner by blow-off method. As a result, it was determined to be 18 $\mu$C/g, showing an excellent positive chargeability.

COMPARATIVE EXAMPLE 3

Capsule grains were obtained in the same manner as in Example 3 except that 20 g of bisphenol A was added to the magnetic powder dispersion instead of 2,2'-azobis(2-cyanopropanol) as the first polymerization-initiating azo group-introduced capsule shell-forming monomer.

3 g of the capsule grains thus obtained and 100 g of an iron powder carrier were mixed in an atmosphere of a temperature of 20° C. and a humidity of 50%. The mixture was then measured for amount of electric charge as a capsule toner by blow-off method. As a result, it was determined to be +1 $\mu$C/g, showing little or no chargeability.

EXAMPLE 4

Synthesis of the Second Capsule Shell-forming Monomer Introduced with Polymerization-initiating Azo Group 200 ml of dried ethyl acetate and 40 g of tolylene diisocyanate (Coronate-T, produced by Nippon Polyurethane Co., Ltd.) were charged into a 500-ml round flask equipped with a condenser with a calcium chloride pipe. Dissolution was effected with stirring by means of a magnetic stirrer. 20 g of 2,2'-azobis(2-cyanopropanol) (VF-077, produced by Wako Pure Chemical Industries Ltd.) was added to the solution. The reaction system was then reacted at a temperature of 30° C. for 12 hours. After the completion of reaction, ethyl acetate was then removed under reduced pressure to obtain the second capsule shell-forming monomer introduced with polymerization-initiating azo group.

Preparation of Capsule Grains

To a mixture of 10 g of dibutyl phthalate, 40 g of Isopar H and 40 g of ethyl acetate were added 50 g of polylauryl methacrylate (weight average molecular weight: $5\times10^4$) and 30 g of polyisobutyl methacrylate (weight average molecular weight: $16\times10^4$). Dissolution was then effected. To the solution thus obtained was added 120 g of a magnetic powder (EPT-1000, produced by Toda Kogyo K.K.). The mixture was then dispersed by means of a ball mill for 16 hours. To 200 g of the dispersion were added 20 g of the above mentioned capsule shell-forming monomer, 10 g of a polyisocyanate (Sumidur-L, produced by Sumitomo Bayer Urethane K.K.) and 24 g of ethyl acetate. The composition was thoroughly mixed to obtain Solution A.

10 g of hydroxypropyl methylcellulose (Metrose 65SH50, produced by The Shin-etsu Chemical Industry Co., Ltd.) was dissolved in 200 g of ion-exchanged water. The solution was then cooled to a temperature of 5° C. to obtain Solution B.

Solution A was gradually added to Solution B while the latter was stirred by means of an emulsifier (Autohomomixer produced by Tokushu Kako K.K.). Thus, an O/W type emulsion comprising oil drops having an average grain diameter of about 12 $\mu$m was obtained.

The emulsion was then stirred at 400 r.p.m. by means of an agitator equipped with propeller blades (Three-one motor, produced by Shinto Kagaku K.K.) instead of the emulsifier. After 10 minutes, to the emulsion was added dropwise 100 g of a 5% aqueous solution of diethylene triamine as the first capsule shell-forming monomer. After the completion of dropwise addition, capsulization reaction was effected for 3 hours while ethyl acetate was removed at a temperature of 40° C. under reduced pressure. After the completion of reaction, the reaction system was poured into 2 l of ion-exchanged water. The mixture was thoroughly stirred and then allowed to stand. After the sedimentation of capsule grains, the supernatant was removed. This procedure was repeated seven times to wash the capsule grains. Thus, capsule grains in which polymerization-initiating azo groups had been introduced into the polymer constituting the capsule shell were obtained.

To the above mentioned capsule grains was added ion-exchanged water to prepare a suspension having a solid content of 40%. 125 g of the suspension of capsule grains thus prepared (corresponding to 50 g of capsule grains) was charged into a 1-l separable flask equipped with a condenser and an nitrogen intake pipe. 125 g of ion-exchanged water was added to the system. The mixture was then stirred at 200 r.p.m. in an atmosphere of nitrogen by means of an agitator equipped with propeller blades (Three-one motor produced by Shinto Kagaku K.K.). To the mixture were added 1.0 g of diethylaminoethyl methacrylate and 2.0 g of methyl methacrylate. The reaction system was then allowed to undergo reaction at a temperature of 70° C. for 5 hours. After the completion of reaction, the reaction system was poured into 2 l of ion-exchanged water, thoroughly stirred, and then allowed to stand. After the sedimentation of capsule grains, the supernatant was removed. This procedure was repeated four times to wash the capsule grains. The capsule dispersion thus obtained was poured into a stainless steel tray where it was then dried at a temperature of 60° C. for 10 hours in a drier (produced by Yamato Kagaku K.K.).

3 g of the capsule grains thus obtained and 100 g of an iron powder carrier were mixed in an atmosphere of a temperature of 20° C. and a humidity of 50%. The mixture was then measured for amount of electric charge as a capsule toner by blow-off method. As a result, it was determined to be +20 μC/g, showing an excellent positive chargeability.

COMPARATIVE EXAMPLE 4

Capsule grains were obtained in the same manner as in Example 4 except that only 30 g of a polyisocyanate (Sumidur-L, produced by Sumitomo Bayer Urethane K.K.) was added to the magnetic powder dispersion instead of the second polymerization-initiating azo group-introduced capsule shell-forming monomer.

3 g of the capsule grains thus obtained and 100 g of an iron powder carrier were mixed in an atmosphere of a temperature of 20° C. and a humidity of 50%. The mixture was then measured for amount of electric charge as a capsule toner by blow-off method. As a result, it was determined to be +1 μC/g, showing little or no chargeability.

EXAMPLE 5

120 g of a lauryl methacrylate monomer and 2 g of azobisisobutylonitrile were dissolved in 20 g of ethyl acetate. To the solution was added 80 g of a magnetic powder which had been subjected to hydrophobic treatment with a titanium coupling agent. The material was then dispersed by means of a ball mill for 24 hours. To 200 g of the dispersion were added 10 g of 2,2'-azobis{2-methyl-N-[1,1-bis(hydroxymethyl)ethyl]propionic amide} (VA-082, produced by Wako Pure Chemical Industries, Ltd.), 10 g of 1,4-naphthalenediol and 30 g of diphenylmethane diisocyanate (Sumidur 44S, produced by Sumitomo Bayer Urethane K.K.) as the second capsule shell-forming monomer. The composition was thoroughly mixed to obtain Solution A.

10 g of hydroxypropyl methylcellulose (Metrose 65SH50, produced by The Shin-etsu Chemical Industry Co., Ltd.) and 0.5 g of 2,2'-azobis(2-amidinopropane)-dihydrochloride (V-50, produced by Wako Pure Chemical Industries, Ltd.) were dissolved in 200 g of ion-exchanged water. The solution was adjusted to a pH value of 9 to 10 with 1N-sodium hydroxide, and then cooled to a temperature of 5° C. to obtain Solution B.

Solution A was gradually added to Solution B while the latter was stirred by means of an emulsifier (Autohomomixer produced by Tokushu Kako K.K.). Thus, an O/W type emulsion comprising oil drops having an average grain diameter of about 12 μm was obtained.

The emulsion was then stirred at 400 r.p.m. by means of an agitator equipped with propeller blades (Three-one motor, produced by Shinto Kagaku K.K.) instead of the emulsifier. Capsulization reaction was effected for 3 hours while ethyl acetate was removed at a temperature of 40° C. under reduced pressure. After the completion of reaction, the reaction system was poured into 2 l of ion-exchanged water. The mixture was thoroughly stirred and then allowed to stand. After the sedimentation of capsule grains, the supernatant was removed. This procedure was repeated seven times to wash the capsule grains. Thus, capsule grains in which polymerization-initiating azo groups had been introduced into the polymer constituting the capsule shell were obtained.

To the above mentioned capsule grains was added ion-exchanged water to prepare a suspension having a solid content of 40%. 125 g of the suspension of capsule grains thus prepared (corresponding to 50 g of capsule grains) was charged into a 1-l separable flask equipped with a condenser and an nitrogen intake pipe. 125 g of ion-exchanged water was added to the system. The mixture was then stirred at 200 r.p.m. in a nitrogen atmosphere by means of an agitator equipped with propeller blades (Three-one motor produced by Shinto Kagaku K.K.). To the mixture were added 1.0 g of methacrylic acid and 2.0 g of methyl methacrylate. The reaction system was then allowed to undergo reaction at a temperature of 70° C. for 10 hours. After the completion of reaction, the reaction system was poured into 2 l of ion-exchanged water, thoroughly stirred, and then allowed to stand. After the sedimentation of capsule grains, the supernatant liquid was removed. This procedure was repeated four times to wash the capsule grains to obtain a capsule toner of the present invention. The capsule dispersion thus obtained was poured into a stainless steel tray where it was then dried at a temperature of 60° C. for 10 hours in a drier (produced by Yamato Kagaku K.K.).

3 g of the capsule grains thus obtained and 100 g of an iron powder carrier were mixed in an atmosphere of a temperature of 20° C. and a humidity of 50%. The mixture was then measured for amount of electric charge on capsule toner by blow-off method. As a result, it was determined to be −16 μC/g, showing an excellent negative chargeability.

COMPARATIVE EXAMPLE 5

A capsule toner was obtained in the same manner as in Example 5 except that only 20 g of 1,4-naphthalenediol was added to the magnetic powder dispersion and 0.2 g of diethylenetriamine was added to the solution of hydroxypropyl methylcellulose instead of 2,2'-azobis{2-methyl-N-[1,1-bis(hydroxymethyl)ethyl]-propionic amide} and 2,2'-azobis(2-amidinopropane) dihydrochloride as the first polymerization-initiating azo group-introduced capsule shell-forming monomer.

3 g of the capsule toner thus obtained and 100 g of an iron powder carrier were mixed in an atmosphere of a temperature of 20° C. and a humidity of 50%. The mixture was then measured for amount of electric charge as a capsule toner by blow-off method. As a result, it was determined to be +1 μC/g, showing little or no chargeability.

EXAMPLE 6

Synthesis of the Second Capsule Shell-forming Monomer Introduced with Polymerization-initiating Azo Group 200 ml of dried ethyl acetate and 40 g of hexamethylene diisocyanate (Desmodur-H, produced by Sumitomo Bayer Urethane K.K.) were charged into a 500-ml round flask equipped with a condenser with a calcium chloride pipe. Dissolution was effected with stirring by means of a magnetic stirrer. 30 g of 2,2'-azobis[2-methyl-N-(2-hydroxyethyl)propionic amide] (VA-086, produced by Wako Pure Chemical Industries, Ltd.) was added to the solution. The reaction system was then reacted at a temperature of 30° C. for 12 hours. After the completion of reaction, ethyl acetate was then removed under reduced pressure to obtain the second capsule shell-forming monomer introduced with polymerization-initiating azo group.

Preparation of Capsule Grains

To 20 g of ethyl acetate was added 120 g of a lauryl methacrylate monomer and 2 g of azobisisobutylonitrile. Dissolution was then effected. To the solution thus obtained was added 80 g of a magnetic powder which had been subjected to hydrophobic treatment with a titanium coupling agent. The material was then dispersed by means of a ball mill for 24 hours. To 200 g of the dispersion was added 20 g of the above mentioned capsule shell-forming monomer. The composition was thoroughly mixed to obtain Solution A.

10 g of hydroxypropyl methylcellulose (Metrose 65SH50, produced by The Shin-etsu Chemical Industry Co., Ltd.) was dissolved in 200 g of ion-exchanged water. The solution was then cooled to a temperature of 5° C. to obtain Solution B.

Solution A was gradually added to Solution B while the latter was stirred by means of an emulsifier (Autohomomixer produced by Tokushu Kako K.K.). Thus, an O/W type emulsion comprising oil drops having an average grain diameter of about 12 $\mu$m was obtained.

The emulsion was then stirred at 400 r.p.m. by means of an agitator equipped with propeller blades (Three-one motor, produced by Shinto Kagaku K.K.) instead of the emulsifier. After 10 minutes, to the emulsion was added dropwise 100 g of a 5% aqueous solution of diethylene triamine as the first capsule shell-forming monomer. After the completion of dropwise addition, capsulization reaction was effected for 3 hours while ethyl acetate was removed at a temperature of 40° C. under reduced pressure. After the completion of reaction, the reaction system was poured into 2 l of ion-exchanged water. The mixture was thoroughly stirred and then allowed to stand. After the sedimentation of capsule grains, the supernatant was removed. This procedure was repeated seven times to wash the capsule grains. Thus, capsule grains in which polymerization-initiating azo groups had been introduced into the polymer constituting the capsule shell were obtained.

To the above mentioned capsule grains was added ion-exchanged water to prepare a suspension having a solid content of 40%. 125 g of the suspension of capsule grains thus prepared (corresponding to 50 g of capsule grains) was charged into a 1-l separable flask equipped with a condenser and an nitrogen intake pipe. 125 g of ion-exchanged water was added to the system. The mixture was then stirred at 200 r.p.m. in a nitrogen atmosphere by means of an agitator equipped with propeller blades (Three-one motor produced by Shinto Kagaku K.K.). To the mixture were added 1.0 g of methacrylic acid and 2.0 g of methyl methacrylate. The reaction system was then allowed to undergo reaction at a temperature of 70° C. for ! 0 hours. After the completion of reaction, the reaction system was poured into 2 l of ion-exchanged water, thoroughly stirred, and then allowed to stand. After the sedimentation of capsule grains, the supernatant was removed. This procedure was repeated four times to wash the capsule grains. The capsule dispersion thus obtained was poured into a stainless steel tray where it was then dried at a temperature of 60° C. for 10 hours in a drier (produced by Yamato Kagaku K.K.) to obtain capsule grains of the present invention.

3 g of the capsule grains thus obtained and 100 g of an iron powder carrier were mixed in an atmosphere of a temperature of 20° C. and a humidity of 50 %. The material was then measured for amount of electric charge as a capsule toner by blow-off method. As a result, it was determined to be $-20$ $\mu$C/g, showing an excellent negative chargeability.

COMPARATIVE EXAMPLE 6

A capsule toner was obtained in the same manner as in Example 6 except that 20 g of hexamethylene diisocyanate (Desmodur-H, produced by Sumitomo Bayer Urethane K.K.) was added to the magnetic powder dispersion instead of the second polymerization-initiating azo group-introduced capsule shell-forming monomer.

3 g of the capsule grains thus obtained and 100 g of an iron powder carrier were mixed in an atmosphere of a temperature of 20° C. and a humidity of 50%. The mixture was then measured for amount of electric charge as a capsule toner by blow-off method. As a result, it was determined to be $+1$ $\mu$C/g, showing little or no chargeability.

EXAMPLE 7

To a mixture of 10 g of dibutyl adipate, 40 g of Isopar H (produced by Exxon Chemical) and 40 g of ethyl acetate were added 50 g of polylauryl methacrylate (weight average molecular weight: $5 \times 10^4$) and 30 g of polyisobutyl methacrylate (weight average molecular weight: $16 \times 10^4$). Dissolution was then effected. To the solution thus obtained was added 120 g of a magnetic powder (EPT-1000, produced by Toda Kogyo K.K.). The mixture was then dispersed by means of a ball mill for 16 hours. To 200 g of the dispersion were added 15 g of 2,2'-azobis(2-cyanopropanol) (VF-077, produced by Wako Pure Chemical Industries, Ltd.) as the first capsule shell-forming monomer, 10 g of tolylene diisocyanate (Coronate-T, produced by Nippon Polyurethane K.K.), 10 g of a polyisocyanate (Sumidur L, produced by Sumitomo Bayer Urethane K.K.) and 24 g of ethyl acetate. The composition was thoroughly mixed to obtain Solution A.

10 g of hydroxypropyl methylcellulose (Metrose 65SH50, produced by The Shin-etsu Chemical Industry Co., Ltd.) was dissolved in 200 g of ion-exchanged water. The solution was then cooled to a temperature of 5° C. to obtain Solution B.

Solution A was gradually added to Solution B while the latter was stirred by means of an emulsifier (Autohomomixer produced by Tokushu Kako K.K.). Thus, an O/W type emulsion comprising oil drops having an average grain diameter of about 12 $\mu$m was obtained.

The emulsion was then stirred at 400 r.p.m. by means of an agitator equipped with propeller blades (Three-one motor, produced by Shinto Kagaku K.K.) instead of the emulsifier. Capsulization reaction was effected for 3 hours while ethyl acetate was removed at a temperature of 40° C. under reduced pressure. After the completion of reaction, the reaction system was poured into 2 l of ion-exchanged water. The mixture was thoroughly stirred and then allowed to stand. After the sedimentation of capsule grains, the supernatant was removed. This procedure was repeated seven times to wash the capsule grains. Thus, capsule grains in which polymerization-initiating azo groups had been introduced into the polymer constituting the capsule shell were obtained.

To the above mentioned capsule grains was added ion-exchanged water to prepare a suspension having a solid content of 40%. 125 g of the suspension of capsule grains thus prepared (corresponding to 50 g of capsule grains) was charged into a 1-1 separable flask equipped with a condenser and an nitrogen intake pipe. 125 g of ion-exchanged water was added to the system. The mixture was then stirred at 200 r.p.m. in an atmosphere of nitrogen by means of an agitator equipped with propeller blades (Three-one motor produced by Shinto Kagaku K.K.). To the material were added 1.0 g of diethylaminoethyl methacrylate and 2.0 g of methyl methacrylate. The reaction system was then allowed to undergo reaction at a temperature of 70° C. for 5 hours. After the completion of reaction, the reaction system was poured into 2 l of ion-exchanged water, thoroughly stirred, and then allowed to stand. After the sedimentation of capsule grains, the supernatant was removed. This procedure was repeated four times to wash the capsule grains. The capsule dispersion thus obtained was poured into a stainless steel tray where it was then dried at a temperature of 60° C. for 10 hours in a drier (produced by Yamato Kagaku K.K.).

3 g of the capsule grains thus obtained and 100 g of an iron powder carrier were mixed in an atmosphere of a temperature of 20° C. and a humidity of 50%. The mixture was then measured for amount of electric charge on capsule toner by blow-off method. As a result, it was determined to be $+18$ $\mu$C/g, showing an excellent positive chargeability.

To 100 parts of this toner was added 1 part of a hydrophobic silica (RA-200H, produced by Nihon Aerogel K.K.). The mixture was thoroughly mixed. The capsule toner obtained was then evaluated for image quality using a copying machine which is a remodelled version of Fuji Xerox 2700 for capsule toner. As a result, stable copies were obtained without fog up to the 20,000th sheet.

COMPARATIVE EXAMPLE 7

A capsule toner was obtained in the same manner as in Example 7 except that 20 g of bisphenol A was added to the magnetic powder dispersion instead of 2,2'-azobis2-cyanopropanol as the first polymerization-initiating azo group-introduced capsule shell-forming monomer. 3 g of the capsule grains thus obtained and 100 g of an iron powder carrier were mixed in an atmosphere of a temperature of 20° C. and a humidity of 50%. The mixture was then measured for amount of electric charge as a capsule toner by blow-off method. As a result, it was determined to be $+1$ $\mu$C/g, showing little or no chargeability.

The capsule toner was evaluated for image quality in the same manner as in Example 7. As a result, fog appeared from the 1st sheet, and the 50th sheet exhibited a reduced image density and a remarkably poor sharpness.

EXAMPLE 8

120 g of a lauryl methacrylate monomer and 2 g of azobisisobutylonitrile were dissolved in 20 g of ethyl acetate. To the solution was added 80 g of a magnetic powder which had been subjected to hydrophobic treatment with a titanium coupling agent. The material was then dispersed by means of a ball mill for 24 hours. To 200 g of the dispersion were added 10 g of 2,2'-azobis{2-methyl-N-[1,1-bis(hydroxymethyl)ethyl]propionic amide} (VA-082, produced by Wako Pure Chemical Industries, Ltd.), 10 g of 1,4-naphthalenediol and 15 g of diphenylmethane diisocyanate (Sumidur 44S, produced by Sumitomo Bayer Urethane K.K.) as the second capsule shell-forming monomer. The composition was thoroughly mixed to obtain Solution A.

10 g of hydroxypropyl methylcellulose (Metrose 65SH50, produced by The Shin-etsu Chemical Industry Co., Ltd.) was dissolved in 200 g of ion-exchanged water. The solution was then cooled to a temperature of 5° C. to obtain Solution B.

Solution A was gradually added to Solution B while the latter was stirred by means of an emulsifier (autohomomixer produced by Tokushu Kako K.K.). Thus, an O/W type emulsion comprising oil drops having an average grain diameter of about 12 $\mu$m was obtained.

The emulsion was then stirred at 400 r.p.m. by means of an agitator equipped with propeller blades (Three-one motor, produced by Shinto Kagaku K.K.) instead of the emulsifier. Capsulization reaction was effected for 3 hours while ethyl acetate was removed at a temperature of 40° C. under reduced pressure. After the completion of reaction, the reaction system was poured into 2 l of ion-exchanged water. The mixture was thoroughly stirred and then allowed to stand. After the sedimentation of capsule grains, the supernatant was removed. This procedure was repeated seven times to wash the capsule grains. Thus, capsule grains in which polymerization-initiating azo groups had been introduced into the polymer constituting the capsule shell were obtained.

To the above mentioned capsule grains was added ion-exchanged water to prepare a suspension having a solid content of 40%. 125 g of the suspension of capsule grains thus prepared (corresponding to 50 g of capsule grains) was charged into a 1-1 separable flask equipped with a condenser and an nitrogen intake pipe. 125 g of ion-exchanged water was added to the system. The material was then stirred at 200 r.p.m. in a nitrogen atmosphere by means of an agitator equipped with propeller blades (Three-one motor produced by Shinto Kagaku K.K.). To the mixture was added 2.0 g of trifluoroethyl methacrylate. The reaction system was then allowed to undergo reaction at a temperature of 70° C. for 10 hours. After the completion of reaction, the reaction system was poured into 2 l of ion-exchanged water, thoroughly stirred, and then allowed to stand. After the sedimentation of capsule grains, the supernatant was removed. This procedure was repeated four times to wash the capsule grains to obtain a capsule toner of the present invention. The capsule dispersion thus obtained was poured into a stainless steel tray where it was then dried at a temperature of 60° C. for 10 hours in a drier (produced by Yamato Kagaku K.K.).

3 g of the capsule grains thus obtained and 100 g of an iron powder carrier were mixed in an atmosphere of a temperature of 20° C. and a humidity of 50%. The mixture was then measured for amount of electric charge on capsule toner by blow-off method. As a result, it was determined to be $-16$ $\mu$C/g, showing an excellent negative chargeability.

To 100 parts of this toner was added 1 part of a hydrophobic silica (RA-972, produced by Nihon Aerogel K.K.). The mixture was thoroughly mixed. The capsule toner obtained was then evaluated for image quality. The copying machine used was a copying machine which is a remodelled version of Fuji Xerox 2700 for capsule toner. Reversal development was used to obtain copy samples. As a result, stable copies were obtained without fog up to the 20,000th sheet.

COMPARATIVE EXAMPLE 8

A capsule toner was obtained in the same manner as in Example 8 except that 20 g of 1,4-naphthalenediol was added to the magnetic powder dispersion instead of 2,2'-azobis{2-methyl-N-[1,1-bis(hydroxymethyl)ethyl]-propionic amide} as the first polymerization-initiating azo group-introduced capsule shell-forming monomer. 3 g of the capsule toner thus obtained and 100 g of an iron powder carrier were mixed in an atmosphere of a temperature of 20° C. and a humidity of 50%. The mixture was then measured for amount of electric charge as a capsule toner by blow-off method. As a result, it was determined to be +1 μC/g, showing little or no chargeability.

The capsule toner was evaluated for image quality in the same manner as in Example 8. As a result, fog appeared from the 1st sheet, and the 50th sheet exhibited a reduced image density and a remarkably poor sharpness.

EXAMPLE 9

To 20 g of a saturated hydrocarbon solvent (Isopar-H, produced by Exon Chemical) and 20 g of ethyl acetate were added 100 g of a polylauryl methacrylate and 20 g of a petroleum resin (FTR-6125, produced by Mitsui Petrochemical Industries, Ltd.). Dissolution was then effected. To the solution was added 120 g of a magnetic powder which had been subjected to hydrophobic treatment with a titanium coupling agent. The mixture was then dispersed by means of a ball mill for 24 hours. To 200 g of the dispersion were added 10 g of 4,4'-azobis-4-cyanopentoic acid chloride, 10 g of isocyanate (Sumidur-L, produced by Sumitomo Bayer Polyurethane K.K.), 4 g of tolylene diisocyanate (Coronate-T, produced by Nippon Polyurethane K.K.) and 4 g of an epoxy resin (Epicoat 812, produced by Yuka Shell Epoxy K.K.). The composition was thoroughly mixed to obtain Solution A.

10 g of hydroxypropyl methylcellulose (Metrose 65SH50, produced by The Shin-etsu Chemical Industry Co., Ltd.) and 0.5 g of 2,2'-azobis(2-amidinopropane) dihydrochloride-were dissolved in 250 g of ion-exchanged water. The solution was adjusted to a pH value of 9 to 10 with 1N-sodium hydroxide, and then cooled to a temperature of 5° C. to obtain Solution B.

Solution A was gradually added to Solution B while the latter was stirred by means of an emulsifier (autohomomixer produced by Tokushu Kako K.K.). Thus, an O/W type emulsion comprising oil drops having an average grain diameter of about 12 μm was obtained.

The emulsion was then stirred at 400 r.p.m. by means of an agitator equipped with propeller blades (Three-one motor, produced by Shinto Kagaku K.K.) instead of the emulsifier. After 10 minutes, to the solution were added dropwise 50 g of a 2.5% aqueous solution of diethylene triamine and 50 g of a 2.5% aqueous solution of 2,2'-azobis(2-amidinopropane) dihydrochloride which had been adjusted to a pH value of 9 to 10 with 1N-sodium hydroxide. After the completion of dropwise addition, capsulization reaction was effected with stirring at an elevated temperature of 40° C. for 3 hours while ethyl acetate was removed under reduced pressure. After the completion of reaction, the reaction system was poured into 2 l of ion-exchanged water. The mixture was thoroughly stirred and then allowed to stand. After the sedimentation of capsule grains, the supernatant was removed. This procedure was repeated five times to obtain capsule grains. To the capsule grains was added ion-exchanged water to prepare a suspension having a solid content of 40%.

To 125 g of the suspension of capsule grains thus prepared (corresponding to 50 g of capsule grains) was added 125 g of ion-exchanged water. The material was then stirred at 200 r.p.m. by means of an agitator equipped with propeller blades (Three-one motor produced by Shinto Kagaku K.K.). To the mixture added 2.0 g of trifluoroethyl methacrylate. The reaction system was then allowed to undergo reaction at a temperature of 70° C. for 2 hours. Furthermore, to the system was added 2.0 g of methyl methacrylate. The reaction system was further allowed to undergo reaction for 8 hours.

After the completion of reaction, the reaction system was poured into 2 l of ion-exchanged water, thoroughly stirred, and then allowed to stand. After the sedimentation of capsule grains, the supernatant was removed. This procedure was repeated four times to wash the capsule grains to obtain a capsule toner of the present invention. The capsule dispersion thus obtained was poured into a stainless steel tray where it was then dried at a temperature of 60° C. for 10 hours in a drier (produced by Yamato Kagaku K.K.).

3 g of the capsule grains thus obtained and 100 g of an iron powder carrier covered with a phenolic resin were mixed in an atmosphere of a temperature of 20° C. and a humidity of 50%. The mixture was then measured for amount of electric charge as a capsule toner by blow-off method. As a result, it was determined to be −18 μC/g.

To 100 parts of this toner was added 1 part of a hydrophobic silica (RA-972, produced by Nippon Aerogel K.K.). The materials were thoroughly mixed. The capsule toner was then mixture was image quality. The copying machine used was a copying machine which! is a remodelled version of Fuji Xerox 2700 for capsule toner. Reversal development was used to obtain copy samples. As a result, stable copies were obtained without fog up to the 20,000th sheet.

COMPARATIVE EXAMPLE 9

A capsule toner comprising polymerization-initiating azo group-free capsule shell was obtained in the same manner as in Example 9 except that Solution A was free of 4,4'-azobis-4-cyanopentoic acid chloride and Solution B was free of 2,2'-azobis(2-amidinopropane) dihydrochloride. 3 g of the capsule toner thus obtained and 100 g of an iron powder carrier covered with a phenolic resin were mixed in an atmosphere of a temperature of 20° C. and a humidity of 50%. The material was then measured for amount of electric charge on capsule toner by blow-off method. As a result, it was determined to be −1 μC/g.

To 100 parts of this toner was added 1 part of a hydrophobic silica (R972, produced by Nippon Aerogel K.K.) with thorough stirring. The capsule toner was evaluated for image quality in the same manner as in Example 9. As a result, fog appeared from the 1st sheet, and the 50th sheet exhibited a reduced image density and a remarkably poor sharpness.

In accordance with the present invention, a polymerization-initiating azo group is introduced into a capsule shell and then vinyl-polymerized thereto so that polymerization occurs only in the capsule shell. Thus, little free polymer is produced, enabling an efficient vinyl polymerization. The resulting microcapsule of the present invention comprises a capsule shell having an excellent retention of inner materials and a high degree of freedom of selection of materials having a high mechanical strength.

In accordance with the process of the present invention, a monomer having a special function can be block and/or graft-copolymerized to the polymer constituting the capsule shell, making it possible to easily introduce a functional group such as chargeability controlling group into the capsule shell. Therefore, the present invention can be applied to the preparation of microcapsule toners and the like.

While the invention has been described in detail and with reference to specific embodiments thereof, it will be apparent to one skilled in the art that various changes and modifications can be made therein without departing from the spirit and scope thereof.

What is claimed is:

1. A microcapsule comprising a capsule shell having
    at least one polymer structure selected from the group consisting of a polyurea resin, a polyurethane resin, a polyamide resin, a polyester resin and an epoxy resin and
    a block and/or graft copolymer formed by vinyl polymerization of vinyl monomers to said capsule shell,
    wherein said vinyl polymerization is initiated by the decomposition of a polymerization-initiating azo group that has been previously incorporated in at least one shell-forming monomer that forms said polymer structure.

2. A process for the preparation of a microcapsule, which comprises the steps of: (a) allowing a first capsule shell-forming monomer and a second capsule shell-forming monomer, at least one of which contains a polymerization-initiating azo group, to undergo reaction in the inside and/or at the border of an oily drop to form a capsule shell containing a polymerization-initiating azo group and having at least one polymer structure selected from the group consisting of a polyurea resin, a polyurethane resin, a polyamide resin, a polyester resin and an epoxy resin, and then (b) allowing vinyl monomers to be vinyl-polymerized to said capsule shell.

3. A microcapsule produced by the process of claim 2.

4. A microcapsule toner comprising a capsule shell having
    at least one polymer structure selected from the group consisting of a polyurea resin, a polyurethane resin, a polyamide resin, a polyester resin and an epoxy resin and
    a block and/or graft copolymer formed by vinyl polymerization of vinyl monomers containing charge controlling groups to said capsule shell,
    wherein said vinyl polymerization is initiated by the decomposition of a polymerization-initiating azo group that has been previously incorporated in at least one shell-forming monomer that forms said polymer structure.

5. A process for the preparation of a microcapsule toner, which comprises the steps of: (a) allowing a first capsule shell-forming monomer and a second capsule shell-forming monomer, at least one of which contains a polymerization-initiating azo group, to undergo reaction in the inside and/or at the border of an oily drop to form a capsule shell containing a polymerization-initiating azo group and having at least one polymer structure selected from the group consisting of a polyurea resin, a polyurethane resin, a polyamide resin, a polyester resin and an epoxy resin, and then (b) allowing vinyl monomers containing charge controlling groups to be vinyl-polymerized to said capsule shell.

6. A microcapsule toner produced by the process of claim 5.

* * * * *